(12) United States Patent
Nishimura et al.

(10) Patent No.: US 10,688,843 B2
(45) Date of Patent: Jun. 23, 2020

(54) VEHICLE TORSION BEAM SUSPENSION AND VEHICLE TORSION BEAM

(71) Applicants: Y-TEC CORPORATION, Hiroshima (JP); MAZDA MOTOR CORPORATION, Hiroshima (JP)

(72) Inventors: Kazuhiro Nishimura, Hiroshima (JP); Masayuki Jobira, Hiroshima (JP); Hiroyuki Takahashi, Hiroshima (JP); Hideaki Kawaguchi, Hiroshima (JP); Nobuyuki Nakado, Hiroshima (JP); Shun Kuwako, Hiroshima (JP)

(73) Assignees: Y-TEC CORPORATION, Hiroshima (JP); MAZDA MOTOR CORPORATION, Hiroshima (JP)

( * ) Notice: Subject to any disclaimer, the term of this patent is extended or adjusted under 35 U.S.C. 154(b) by 49 days.

(21) Appl. No.: 16/022,808

(22) Filed: Jun. 29, 2018

(65) Prior Publication Data

US 2019/0030978 A1  Jan. 31, 2019

(30) Foreign Application Priority Data

Jul. 27, 2017  (JP) .................. 2017-145771

(51) Int. Cl.
*B60G 21/05* (2006.01)
*B60B 35/04* (2006.01)

(52) U.S. Cl.
CPC ............ *B60G 21/051* (2013.01); *B60B 35/04* (2013.01); *B60G 2200/21* (2013.01); *B60G 2204/1434* (2013.01); *B60G 2206/20* (2013.01); *B60G 2206/202* (2013.01); *B60G 2206/722* (2013.01); *B60G 2206/8102* (2013.01)

(58) Field of Classification Search
CPC .. B60G 21/051; B60G 35/04; B60G 2200/21; B60G 2204/1434; B60G 2206/20; B60G 2206/202; B60G 2206/722; B60G 2206/8102
See application file for complete search history.

(56) References Cited

U.S. PATENT DOCUMENTS

| | | | | |
|---|---|---|---|---|
| 6,145,271 A | * | 11/2000 | Kossmeier | B60G 21/051 296/146.6 |
| 2009/0014975 A1 | * | 1/2009 | Lee | B60B 35/04 280/124.116 |
| 2010/0187788 A1 | * | 7/2010 | Choi | B60G 21/051 280/124.106 |

(Continued)

FOREIGN PATENT DOCUMENTS

| | | |
|---|---|---|
| JP | 2013-091433 A | 5/2013 |
| JP | 2016-199209 A | 12/2016 |

*Primary Examiner* — Paul N Dickson
*Assistant Examiner* — Kurtis Nielson
(74) *Attorney, Agent, or Firm* — Studebaker & Brackett PC

(57) ABSTRACT

A torsion beam of a vehicle torsion beam suspension has a closed cross section. A beam center portion has an inverse substantially v-shaped cross section or a substantially v-shaped cross section. Circumference increasing portions having a longer circumferential length toward the beam ends are disposed at opposite sides of the beam center portion. Each circumference increasing portion has a beam width that is a width in the fore and aft direction of a vehicle body, the beam width gradually increasing toward a beam end, and increasing at a higher rate as a position of the beam width is closer to the beam end.

12 Claims, 13 Drawing Sheets

(56) References Cited

U.S. PATENT DOCUMENTS

| | | | | |
|---|---|---|---|---|
| 2011/0260423 A1* | 10/2011 | Lepre | ................ | B21C 1/24 |
| | | | | 280/124.131 |
| 2015/0115564 A1* | 4/2015 | Peters | ................ | B21D 47/01 |
| | | | | 280/124.166 |
| 2019/0001784 A1* | 1/2019 | Lee | ................ | B60G 21/051 |
| 2019/0091756 A1* | 3/2019 | Iguchi | ................ | B21J 5/02 |
| 2019/0111755 A1* | 4/2019 | Kim | ................ | B60G 21/051 |

\* cited by examiner

A-A

B-B

C-C

D-D

E-E

F-F

G-G

VEHICLE TORSION BEAM SUSPENSION AND VEHICLE TORSION BEAM

CROSS-REFERENCE TO RELATED APPLICATION

This application claims priority to Japanese Patent Application No. 2017-145771 filed on Jul. 27, 2017, the entire disclosure of which is incorporated by reference herein.

BACKGROUND

The present disclosure relates to a vehicle torsion beam suspension and a vehicle torsion beam.

Japanese Unexamined Patent Publication Nos. 2013-091433 and 2016-199209 describe torsion beam suspensions that are a type of vehicle suspension. These suspensions include left and right trailing arms relative to a vehicle body each supporting a wheel and a torsion beam that connects these arms. The trailing arms are rotatably joined to the vehicle body at their base ends and wheels are rotatably mounted to the leading ends. The opposite ends of the torsion beam are bonded to the trailing arms. Spring seats are bonded to the ends of the torsion beam and the trailing arms, and coil springs are disposed between the spring seats and the vehicle body.

Torsion beams are required to have a suitable torsion stiffness for position control during a body roll of the vehicle. Since torsion beams are bonded to the trailing arms and the spring seats at the opposite ends, the torsion beams are also required to have a sufficient bond strength. The suspensions described in Japanese Unexamined Patent Publication Nos. 2013-091433 and 2016-199209 each include a torsion beam having a closed cross section. This torsion beam includes a beam center portion having an inverse substantially v-shaped cross section defined by an upper wall and a lower wall both protruding upward. This sectional shape gives the torsion beam a lower degree of torsional resistance. The sectional shape of the beam varies from the beam center portion toward the opposite ends of the beam such that a space between the upper wall and the lower wall is gradually increased, that is, the cross-sectional area is gradually increased. This structure increases the bending strength of the beam.

As discussed above, the torsion beam is required to have both suitable torsional stiffness and sufficient bending strength. The conventional torsion beam is typically formed from a steel pipe having a constant circumferential length throughout the pipe length by, for example, pressing. Since the circumferential length of the torsion beam is constant, it is difficult to fully satisfy the requirements by only changing the sectional shape.

SUMMARY

In view of the foregoing, it is an object of the present disclosure to provide a torsion beam that has a suitable torsional stiffness and a sufficient strength required as a strength member to which trailing arms are bonded.

To achieve the object above, the torsion beam according to the present disclosure includes circumference increasing portions at opposite sides of the torsion beam, each circumference increasing portion having a longer circumferential length toward a beam end and having a width gradually increasing toward the beam end.

A vehicle torsion beam suspension disclosed herein includes a pair of trailing arms each supporting a wheel to a vehicle body and a torsion beam having a closed cross section, the torsion beam connecting the trailing arms, wherein each trailing arm includes a pivot support portion at an end in a longitudinal direction of the trailing arm to pivotally support the trailing arm relative to the vehicle body, and a wheel mounting portion at another end in the longitudinal direction of the trailing arm, the wheel mounting portion to which the wheel is mounted, the torsion beam has beam ends at opposite ends in a longitudinal direction of the torsion beam, the beam ends each being bonded to a middle portion between the pivot support portion and the wheel mounting portion of the trailing arm, the torsion beam includes a beam center portion having a substantially v-shaped cross section at a center in the longitudinal direction of the torsion beam, the substantially v-shaped cross section being defined by walls facing in pivot directions of the trailing arms, the walls protruding in one of the pivot directions, the torsion beam includes circumference increasing portions at opposite sides of the beam center portion, each circumference increasing portion having a circumferential length that is an entire length in a circumferential direction of the beam longer than a circumferential length of the beam center portion, the circumferential length of the circumference increasing portion increasing toward the beam end, and the circumference increasing portion has a beam width that is a dimension corresponding to the longitudinal direction of the trailing arm, the beam width gradually increasing toward the beam end and increasing at a higher rate as a position of the beam width is closer to the beam end.

The beam center portion having a substantially v-shaped cross section gives the torsion beam a lower degree of torsional resistance. This configuration can achieve a suitable roll stiffness for position control during a body roll of the vehicle and handling stability of the vehicle. The circumference increasing portions disposed at the opposite sides of the beam center portion have a beam width gradually increasing toward the beam ends to which the trailing arms are bonded. Such an increase in the beam width gives portions close to the beam ends a greater bending strength about an axis (hereinafter referred to as "vertical axis" for ease of discussion) extending in a direction orthogonal to the beam width direction and the beam longitudinal direction. The greater bending strength can ensure a sufficient mount strength of the trailing arms.

If such an increase in the beam width for a greater bending strength about the vertical axis sacrifices a dimension (hereinafter referred to as "beam height" for ease of discussion) in a direction orthogonal to the beam width direction and the beam longitudinal direction, the bending strength about an axis (hereinafter referred to as "horizontal axis" for ease of discussion) extending in the beam width direction is reduced. In this case, it is difficult to achieve a desired mount strength of the trailing arms.

In the torsion beam structure described above, the beam width gradually increases in the circumference increasing portions having a circumferential length increasing toward the beam ends. Such an increase in the circumferential length can prevent reduction in the beam height caused by the gradual increase in the beam width. In other words, the bending strength about the horizontal axis can be kept by preventing a lower beam height, and the bending strength about the vertical axis can be increased by the gradual increase in the beam width.

Accordingly, the mount strength of the trailing arms is increased, and this is advantageous in preventing a change in the position of the suspension's instant center.

If the beam width is gradually increased from the beam center portion to the beam ends at a constant rate to achieve a sufficient beam width at the beam ends, a marked discontinuity in shape may be observed at a boundary between the beam center portion and a portion from which the beam width is increased.

The beam width of the torsion beam described above is not increased at a constant rate but is increased at a higher rate as the position of the beam width is closer to the beam end. In this regard, sudden change in the beam width (discontinuity in shape) can be prevented and stress will not be concentrated.

The circumferential length of the circumference increasing portions may gradually increase toward the beam ends throughout the length of the circumference increasing portions or may alternately increase and remain constant toward the beam ends. If the circumferential length of the circumference increasing portions gradually increases toward the beam ends throughout the length thereof, the circumferential length may increase at a constant rate or may increase at a higher rate as a position of the circumferential length is closer to the beam ends.

Although not intended to limit the scope of the present disclosure, the beam center portion having a constant circumferential length may account for, for example, 5 to 20% of the entire length of the torsion beam, and the rest of the portions at the opposite sides of the beam center portion may be configured as circumference increasing portions having a gradually increasing circumferential length toward the beam ends. For another example, the torsion beam may include increased circumference end portions each accounting for 3 to 10% of the entire length of the torsion beam from the respective beam ends. Each increased circumference end portion has a constant circumferential length longer than that of the beam center portion, and a circumference increasing portion having a gradually increasing circumferential length may be located between the beam center portion and the increased circumference end portion.

A vehicle torsion beam disclosed herein has a closed cross section and connects a pair of trailing arms each supporting a wheel to a vehicle body, and includes a beam center portion having a substantially v-shaped cross section at a center in the longitudinal direction of the torsion beam, the substantially v-shaped cross section being defined by walls facing in pivot directions of the trailing arms, the walls protruding in one of the pivot directions, and circumference increasing portions at opposite sides of the beam center portion, each circumference increasing portion having a circumferential length that is an entire length in a circumferential direction of the beam longer than a circumferential length of the beam center portion, the circumferential length of the circumference increasing portion increasing toward a beam end bonded to a trailing arm, wherein the circumference increasing portion has a beam width that is a dimension corresponding to a longitudinal direction of the trailing arms, the beam width gradually increasing toward the beam end and increasing at a higher rate as a position of the beam width is closer to the beam end.

In one embodiment, the circumference increasing portions have a cross-sectional area including a hollow portion inside the beam gradually increasing toward the beam ends, and the cross-sectional area increases at a higher rate as a position of the cross-sectional area is closer to the beam ends.

This configuration can increase the mount strength of the trailing arms to the torsion beam without concentrating stress. This is further advantageous in preventing a change in the position of the suspension's instant center.

In one embodiment, the circumference increasing portions have a wall thickness substantially equal to the wall thickness of the beam center portion. This is advantageous in achieving a sufficient mount strength of the trailing arms by gradually increasing the beam width.

The beam width of the circumference increasing portions may be configured to gradually increase from the beam center portion to the respective beam ends, but in one embodiment, the beam width is configured as described below.

The circumference increasing portions each include a plurality of regions arranged in the longitudinal direction of the torsion beam. The beam width of the regions gradually increases toward a beam end, and the beam width of a region closer to the beam end increases at a higher rate. In this case, each circumference increasing portion is divided into a plurality of regions in which the beam width gradually increases at a different rate. This configuration can prevent a sudden change in the beam width (prevent concentration of stress) between the beam center portion and the circumference increasing portion or between adjacent regions.

Although not intended to limit the scope of the present disclosure, if each circumference increasing portion is configured by a first region contiguous to the beam center portion and a second region contiguous to the first region, the first region may account for 40 to 60% of the entire length of the circumference increasing portion and the rest of the region may be the second region. The first region and the second region may have a gradually increasing circumferential length toward the beam end, and the circumferential length may increase at, but not limited to, a rate of 5 to 25 mm per beam length of 100 mm in the left and right direction of the vehicle body, for example.

In one preferred embodiment, the beam width of the first region is increased at a rate of 8 to 12 mm per beam length of 100 mm in the longitudinal direction of the torsion beam and the beam width of the second region is increased at a rate of 12 to 30 mm per beam length of 100 mm in the longitudinal direction thereof, and the rate of increase in the beam width of the second region is 1.5 to 3 times as high as the rate of increase in the beam width of the first region.

In one embodiment, the regions of the circumference increasing portion have a cross-sectional area including a hollow portion inside the beam gradually increasing toward the beam end, and the cross-sectional area of a region closer to the beam end increases at a higher rate. Since the circumference increasing portion is divided into a plurality of regions having a different rate of increase in the cross-sectional area, a sudden change in the cross-sectional area (concentration of stress) between adjacent regions can be prevented.

In one embodiment, the beam center portion has a constant, substantially v-shaped cross section and extends in the longitudinal direction of the torsion beam, the circumference increasing portions each include a first region contiguous to the beam center portion and a second region contiguous to the first region as a plurality of regions, and the first region has a substantially v-shaped cross section similar to the cross section of the beam center portion, and a tip width at a tip of the substantially v-shaped cross section extending in the beam width direction gradually increases toward the second region.

Such an increase in the tip width of the first region of the circumference increasing portions contiguous to the beam center portion increases the bending strength about the vertical axis and increases the torsional stiffness of the first region compared to that of the beam center portion.

With this configuration, the torsional stiffness of the torsion beam is substantially determined by the torsional characteristics of the beam center portion extending in the left and right direction of the vehicle body with a constant cross section and having a lower degree of torsional resistance. The bending strength and the torsional stiffness in the first region of the circumference increasing portion gradually increase as a position in the first region is away from the beam center portion. This configuration can prevent concentration of large stress at the boundary between the beam center portion and the circumference increasing portion and can increase the bending strength at a position close to the beam end.

In one embodiment, a dimension of the first region in a direction orthogonal to the beam width direction and the beam longitudinal direction, that is, the beam height of the first region is substantially equal to that of the beam center portion, or gradually increases from the beam center portion toward the second region. In other words, the tip width of the first region gradually increases without sacrificing the beam height.

The beam height affects the bending strength about the horizontal axis of the torsion beam. The beam height of the first region is equal to the beam height of the beam center portion or gradually increases from the beam center portion. This configuration ensures that the bending strength about the horizontal axis at positions away from the beam center portion is equal to or greater than that of the beam center portion. This configuration is advantageous in achieving a suitable torsional stiffness at the beam center portion and increasing a strength at beam end portions bonded to the trailing arms.

In one embodiment, the walls facing in the pivot directions of the trailing arms in the second region are gradually spaced apart from each other in the pivot directions as the walls are closer to the beam end. Accordingly, the cross-sectional area including the hollow portion inside the beam gradually increases toward the beam end. This configuration can increase the strength of the beam end portions bonded to the trailing arms.

In one embodiment, the maximum rate of increase in the circumferential length of the circumference increasing portion relative to the circumferential length of the beam center portion is 10% or more, which is calculated from (Lmax−Lc)*100/Lc, where Lc is the circumferential length of the beam center portion and Lmax is the longest circumferential length of the circumference increasing portions. This configuration can increase the strength of the beam end portions bonded to the trailing arms while gradually increasing the beam width.

In one preferred embodiment, the maximum rate of increase in the circumferential length of the circumference increasing portion relative to the circumferential length of the beam center portion is 30% or less in order not to excessively increase the weight of the torsion beam.

The torsion beam according to the present disclosure includes the circumference increasing portions at opposite sides of the beam center portion. The circumferential length of the circumference increasing portions increases toward the beam ends. The beam center portion has a substantially v-shaped cross section. The beam width of the circumference increasing portions gradually increases toward the beam ends and increases at a higher rate as the position of the beam width is closer to the beam ends. This configuration can achieve both suitable torsional stiffness for desired suspension characteristics and sufficient mount strength of the trailing arms without concentrating stress.

DETAILED DESCRIPTION

The following describes an embodiment of the present disclosure with reference to the accompanying drawings. The preferred embodiment to be described below is of illustrative nature and is not intended to limit the scope of the present disclosure, objects to which the present disclosure is applied, or applications thereof.

<Torsion Beam Suspension>

Figure 1:
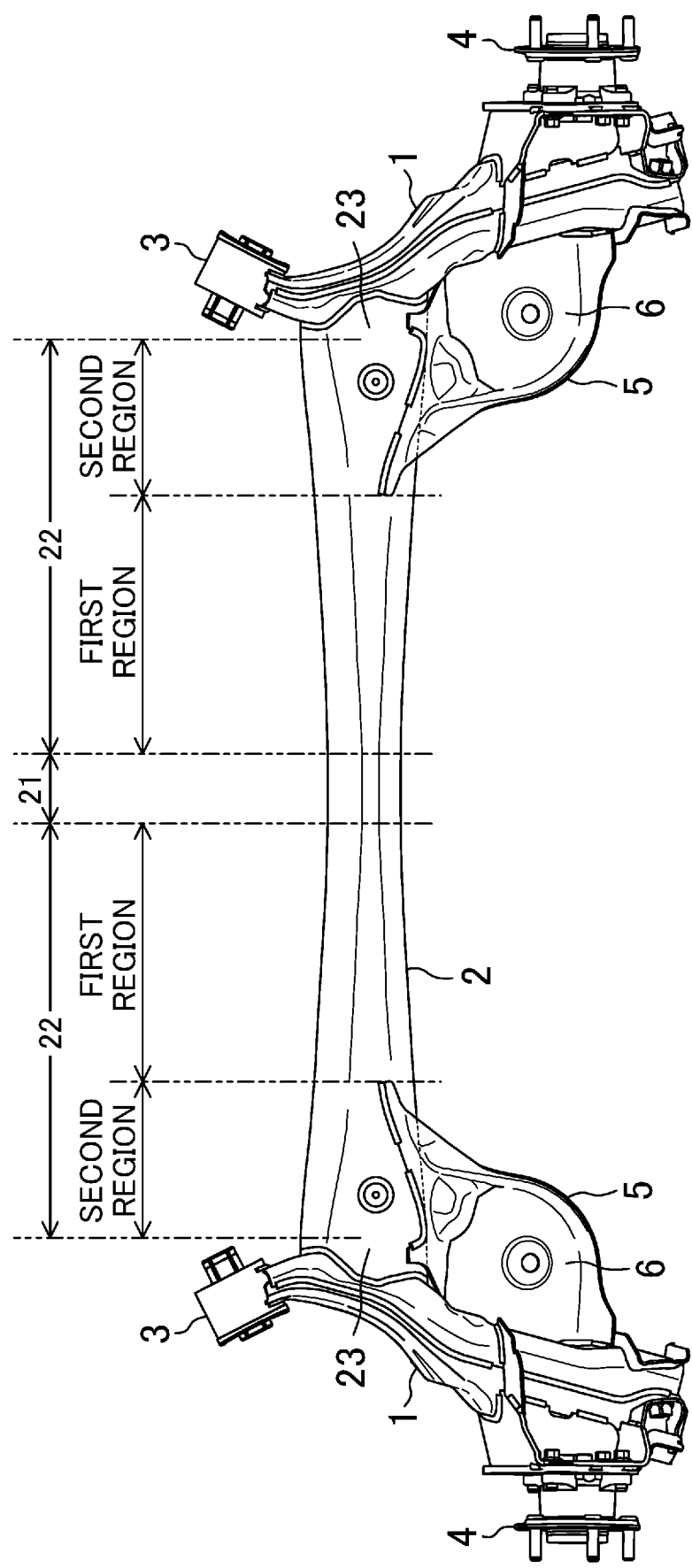
FIG. 1 is a plan view of a torsion beam suspension according to an embodiment of the present disclosure.

A vehicle torsion beam rear suspension illustrated in FIG. 1 (plan view) includes left and right trailing arms 1 relative to a vehicle body each supporting a wheel and a torsion beam 2 having a closed cross section and extending in the left and right direction of the vehicle body to connect the arms 1.

Each trailing arm 1 includes a pivot support portion at the fore end. The pivot support portion is pivotally supported by a joint 3 configured by a pivot and a rubber busing on a rear side frame of the vehicle body, and the rear end of the trailing arm 1 pivots upward and downward relative to the vehicle body. The rear end of the trailing arm 1 is provided with a carrier 4 as a wheel mounting portion. The carrier 4 rotatably supports a wheel rotated by a drive shaft.

A gusset 5 connects a rear-side inner portion of the trailing arm 1 and a rear-side end portion of the torsion beam 2. A spring seat 6 is provided on the gusset 5. A compressed coil spring that configures a vehicle vibration absorption mechanism is interposed between the spring seat 6 and the vehicle body thereabove.

<Material of Torsion Beam>

Figure 2:
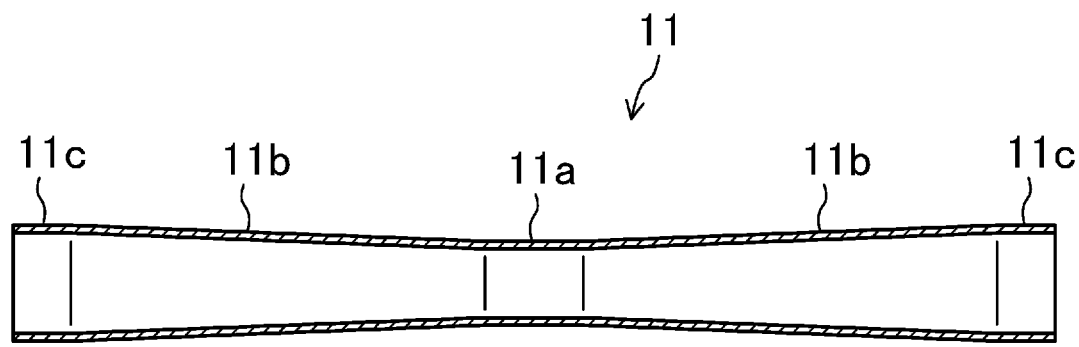
FIG. 2 is a sectional view of a metal pipe that is a material of a torsion beam.

In the present embodiment, the torsion beam 2 is formed from a metal pipe (steel pipe) 11 illustrated in FIG. 2.

The metal pipe 11 is a circular pipe and has a center constant diameter portion 11a extending in the longitudinal direction with a constant diameter and side increasing diameter portions 11b contiguous to the constant diameter portion 11a and having a diameter gradually increasing toward the pipe ends. The increasing diameter portions 11b are contiguous to end constant diameter portions 11c having a greater diameter than that of the center constant diameter portion 11a. The metal pipe 11 has a substantially constant wall thickness throughout the length.

Figure 3:
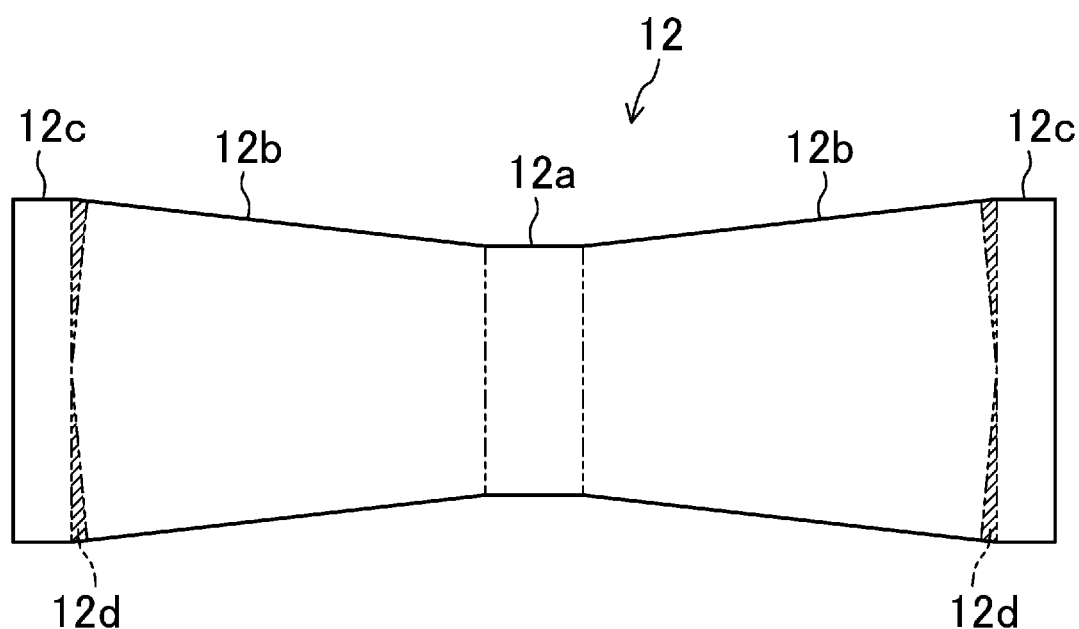
FIG. 3 is a plan view of a metal plate from which the metal pipe is formed.

The metal pipe 11 can be formed from a metal plate 12 illustrated in FIG. 3 by the UO pipe forming process (a combination of U-press and O-press processes). The metal plate 12 has a center constant width portion 12a having a constant plate width for forming the center constant diameter portion 11a of the metal pipe 11, increasing width portions 12b having a gradually increasing plate width contiguous to the opposite sides of the constant width portion 12a for forming the increasing diameter portions 11b of the metal pipe 11, and end constant width portions 12c having a substantially constant plate width contiguous to the increasing width portions 12b for forming the end constant diameter portions 11c of the metal pipe 11.

Figure 4A:
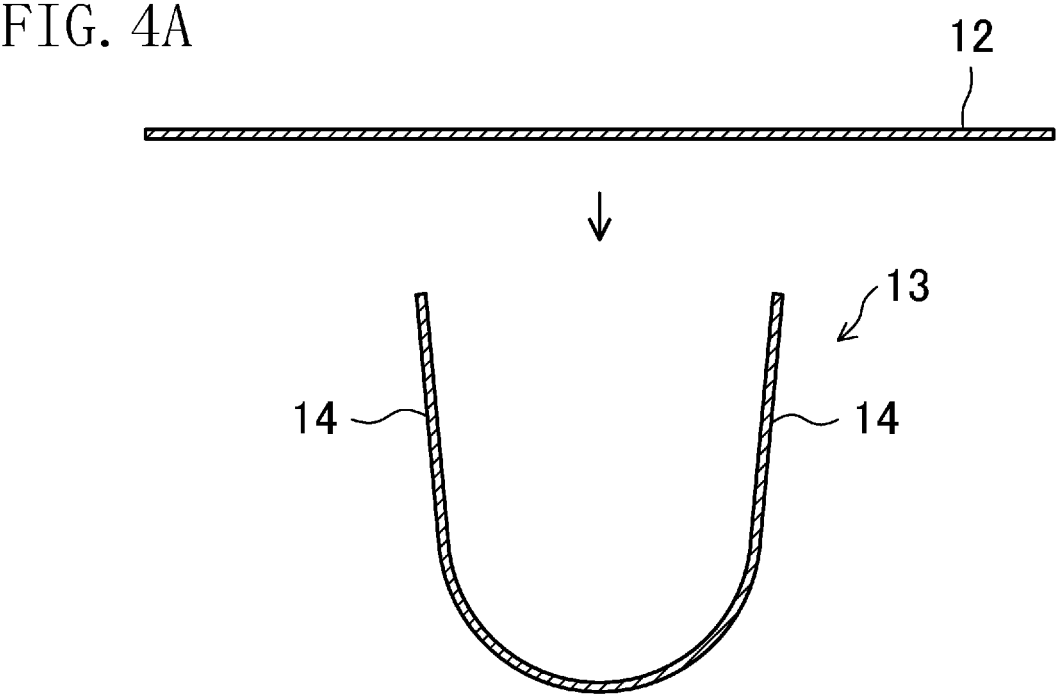
FIGS. 4A-4C are sectional views illustrating changes in shape from the metal plate to the metal pipe.
Figure 4B:
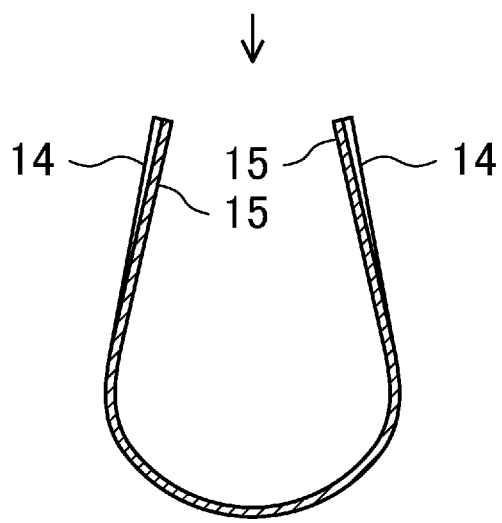
Figure 4C:
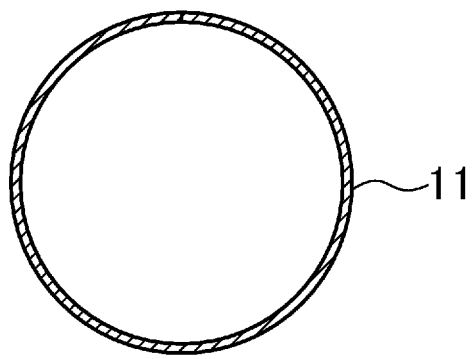

As illustrated in FIGS. 4A-4C, the metal pipe 11 can be formed from the metal plate 12 by a U-press process A, a preform process B, and an O-press process C performed in this order.

In the U-press process A, the metal plate 12 is formed into a u-shaped metal plate 13 using a punch and a die. The formed metal plate 13 has opposing sidewalls 14 with a space inside widening toward ends of the sidewalls 14 due to springback.

In the preform process B, the widening opposing sidewalls 14 of the metal plate 13 are inclined inward. Part of the sidewalls 14 is inclined further inward to form inward inclination portions 15. When the metal plate 12 is formed into the metal pipe 11 by the UO pipe forming process, a portion (hatched area in FIG. 3) between the increasing width portion 12b and the constant width portion 12c becomes an excess portion 12d. To prevent distortion in the metal pipe 11, portions corresponding to excess portions 12d are formed as the inward inclination portions 15.

The O-press process C is performed by using a pair of opposing dies each having a semicircular forming face such that the bottom portion of the metal plate 13 after the preform process B is placed on a die and the dies are closed together. With this process, the u-shaped metal plate 13 is pressed into the o-shaped metal pipe 11 in cross section.

<Structure of Torsion Beam>

The torsion beam 2 according to the present embodiment can be formed by, for example, mechanical press, hydraulic press, or hydroforming on the metal pipe 11 including the increasing diameter portions 11b having a diameter gradually increasing toward the pipe ends.

Figure 5:
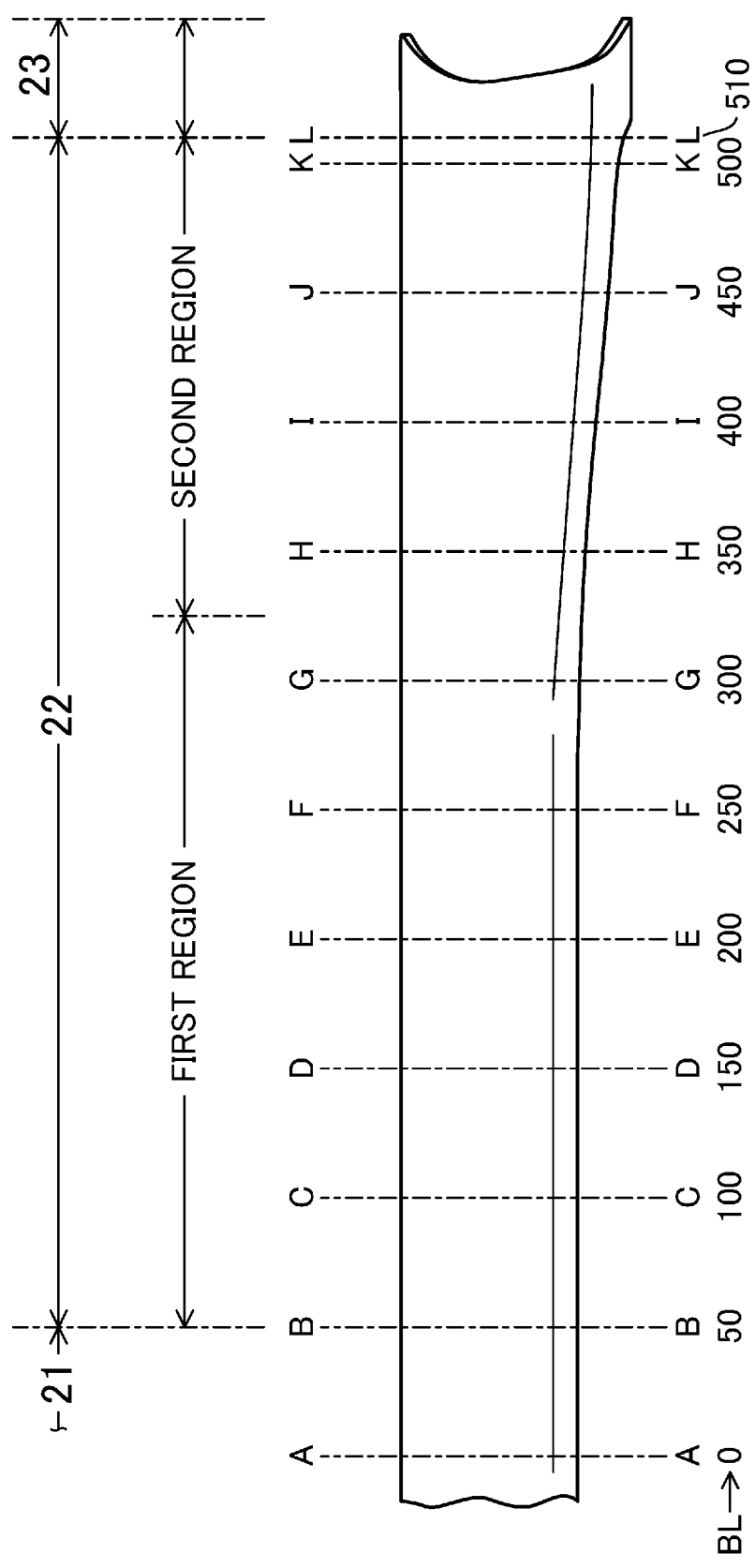
FIG. 5 is a side view of a part of the torsion beam.
Figure 6:
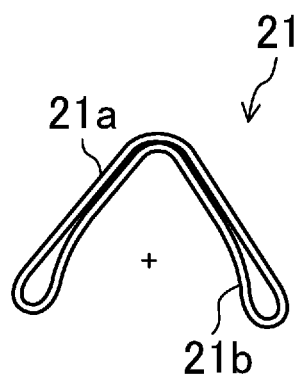
FIG. 6 illustrates sectional views of a beam center portion of the torsion beam taken along lines at two locations.
Figure 6:
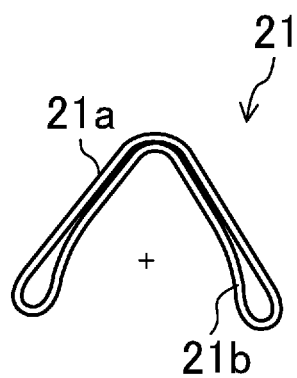
Figure 7:
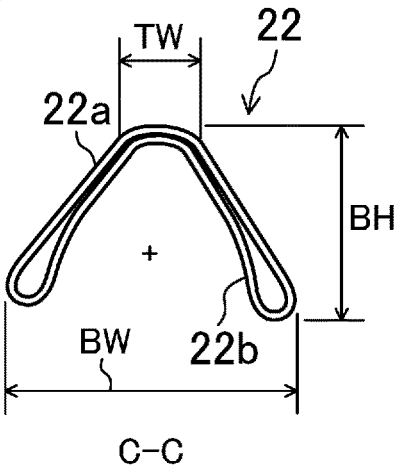
FIG. 7 illustrates sectional views of a first region of a circumference increasing portion of the torsion beam taken along lines at five locations.
Figure 7:
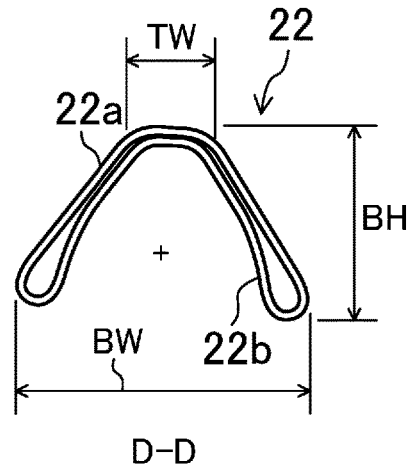
Figure 7:
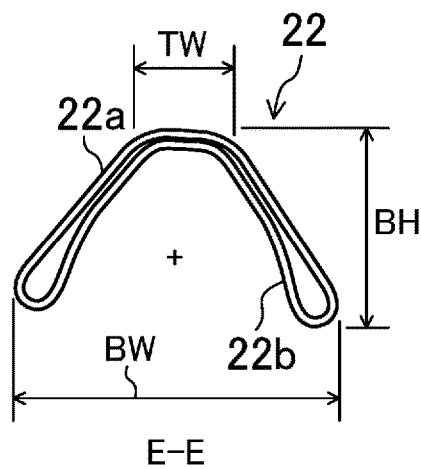
Figure 7:
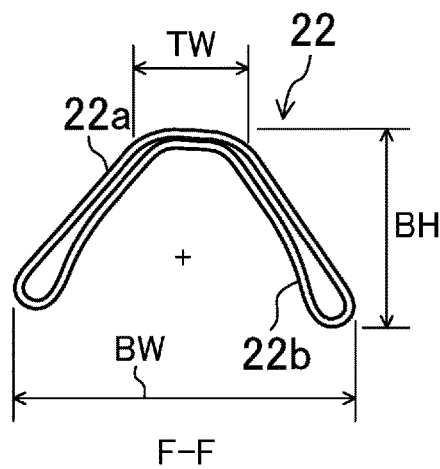
Figure 7:
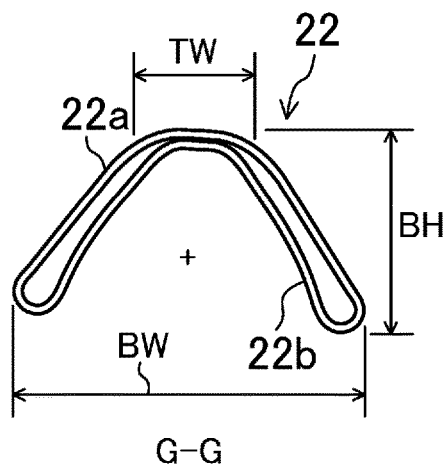
Figure 8:
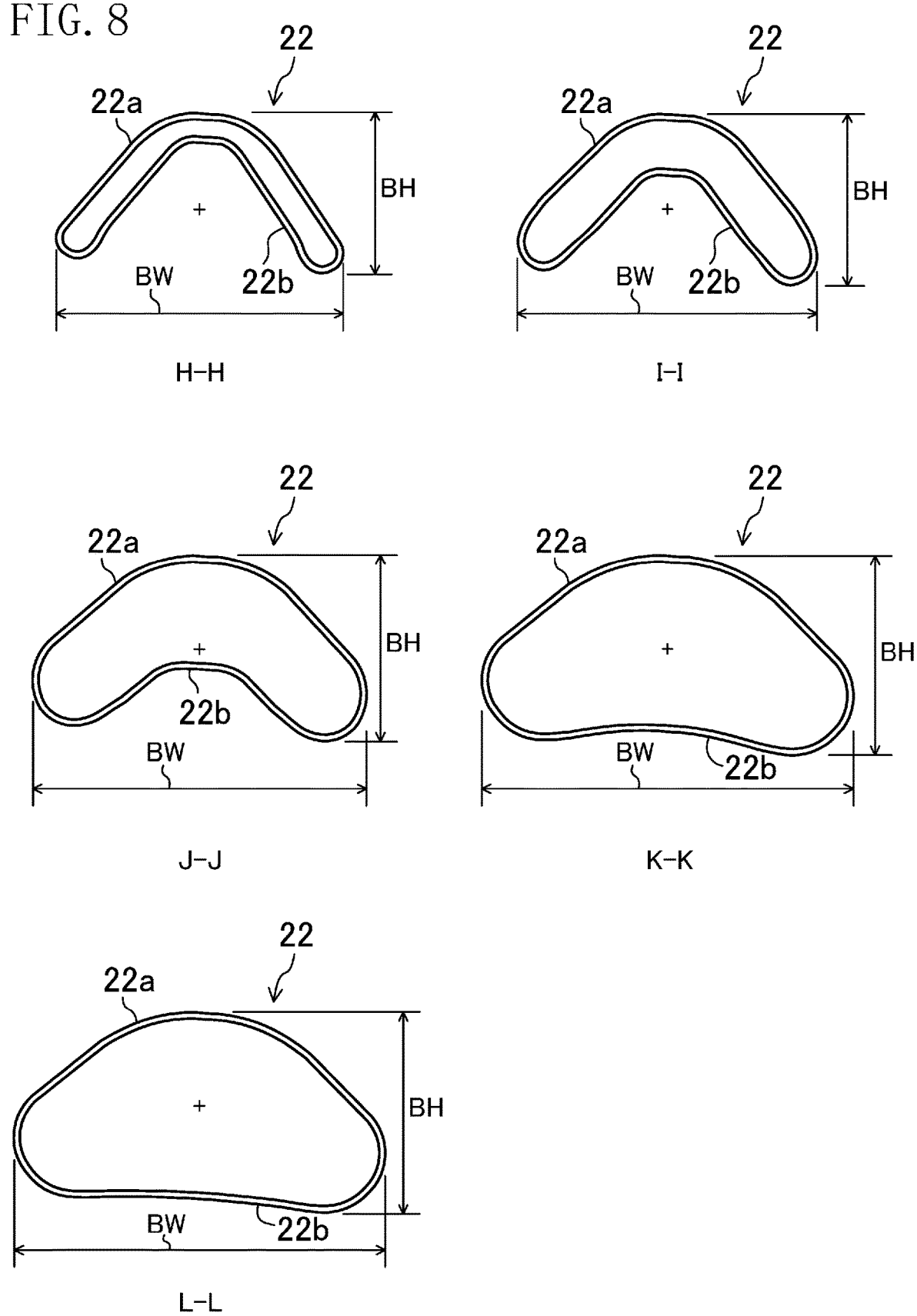
FIG. 8 illustrates sectional views of a second region of the circumference increasing portion of the torsion beam taken along lines at five locations.

FIG. 5 is a side view illustrating a part (a portion from the center to one end) of the torsion beam 2. FIGS. 6 to 8 illustrate cross sections (vertical sections) of the torsion beam 2 taken along lines A-A to L-L in FIG. 5. Line A-A is located at a coordinate of 0 in a BL coordinate system, which is used to represent positions in the left and right direction of the vehicle body in units of millimeters with the center line of the vehicle in the front view being 0. Lines B-B to K-K are located in 50-mm pitch in the BL coordinate, and line L-L is 10 mm away from line K-K and is located close to the beam end (BL=510).

The wall thickness of the torsion beam 2 is substantially constant throughout the length.

The following will fully describe the structure of the torsion beam 2.

[Circumferential Length L of Torsion Beam]

Figure 9:
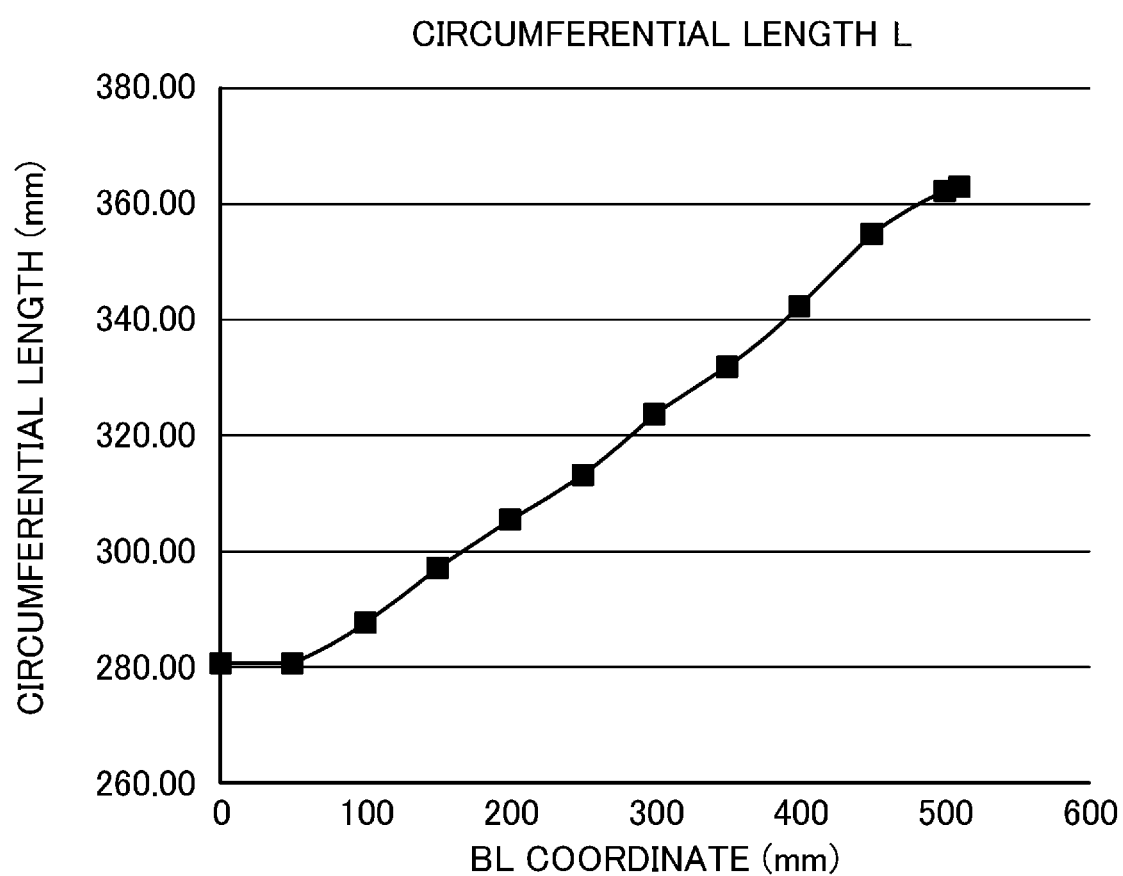
FIG. 9 is a graph illustrating a change in circumferential length of the torsion beam.

FIG. 9 illustrates a circumferential length L (the entire length of the beam periphery in the circumferential direction) of the torsion beam 2 from position A-A to position L-L. The circumferential length L at the location of BL=0 (position A-A) is equal to that of the location of BL=50 (position B-B). The torsion beam 2 is bilaterally symmetrical with respect to the location of BL=0, and thus the circumferential length L at the location of BL=−50 is equal to that of the location of BL=0. In other words, a beam center portion 21 of the torsion beam 2 ranging from BL−50 to 50 has a constant circumferential length L.

As illustrated in FIG. 9, the circumferential length L of the torsion beam 2 increases from BL=50 (position B-B) to BL=510 (position L-L) in the left and right direction of the vehicle body (longitudinal direction of the torsion beam 2) toward a beam end. The portion ranging from BL=50 (position B-B) to BL=510 (position L-L) defines a circumference increasing portion 22. Since the torsion beam 2 is bilaterally symmetrical with respect to BL=0, the circumference increasing portion 22 is disposed at opposite sides of the beam center portion 21.

The center constant diameter portion 11a of the metal pipe 11 illustrated in FIG. 2, which is the material of the torsion beam, forms the beam center portion 21 of the torsion beam 2, the increasing diameter portions 11b of the metal pipe 11 form the circumference increasing portions 22 of the torsion beam 2, and the end constant diameter portions 11c of the metal pipe 11 form increased circumference end portions 23 of the torsion beam 2.

In the present embodiment, the circumferential length L of the circumference increasing portion 22 increases at a substantially constant rate (approximately 18 mm per beam length of 100 mm in the BL coordinate) from the beam center portion 21 toward the beam end. The maximum rate of increase in the circumferential length L of the circumference increasing portion 22 relative to the circumferential length L of the beam center portion 21 is a little less than 30%.

[General Description of Beam Width of Torsion Beam]

Figure 10:
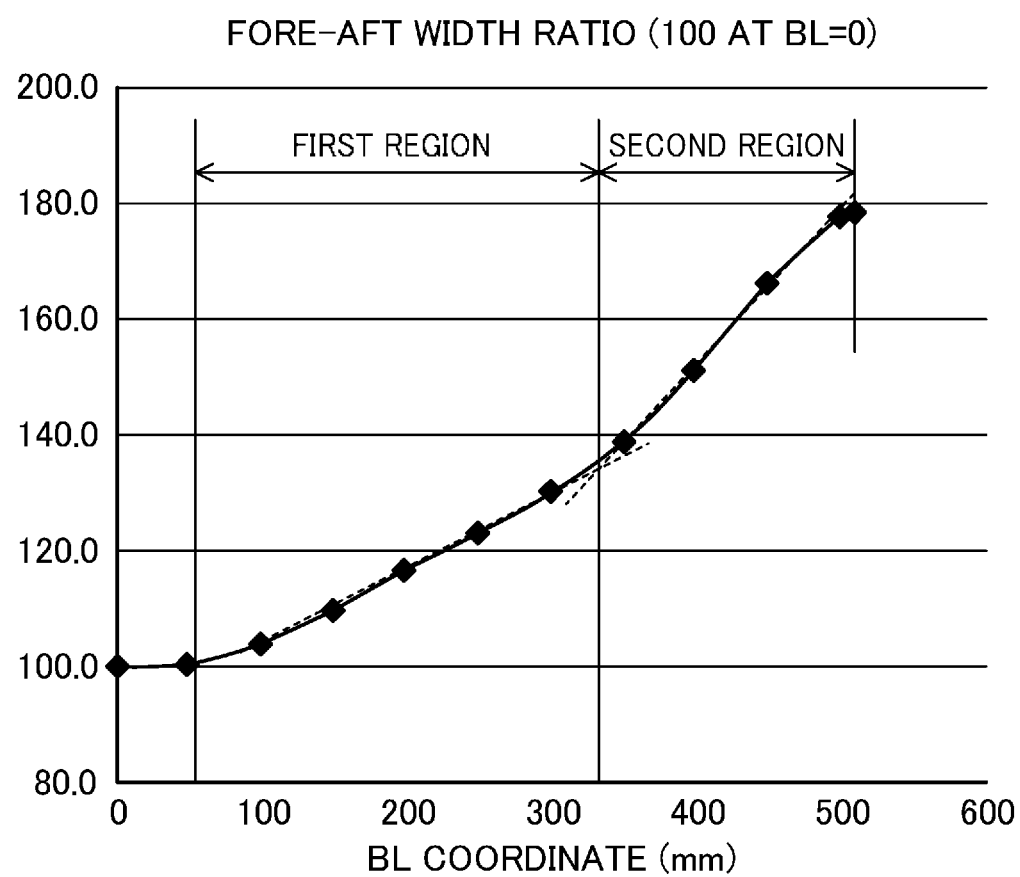
FIG. 10 is a graph illustrating a change in fore-aft width ratio of the torsion beam.

The following describes a beam width BW that is the width of the torsion beam 2 in the fore and aft direction in the vehicle body. The beam width BW is a dimension corresponding to the longitudinal direction of the trailing arms 1. FIG. 10 illustrates a ratio of the beam width BW at each position in the BL coordinate to the beam width BW at BL=0 (position A-A) defined as 100.

As illustrated in FIG. 10, the beam width BW of the beam center portion 21 (from BL=−50 to +50) is substantially constant.

The beam width BW of the circumference increasing portion 22 (from BL=50 to 510) gradually increases toward the beam end and increases at a higher rate as a position of the beam width is closer to the beam end.

In other words, the beam width BW at positions from BL=50 (position B-B) to BL=300 (position G-G) and the beam width BW at positions from BL=350 (position H-H) to BL=500 (position K-K) increase at a respective substantially constant rate. The rate of increase in the beam width BW is changed between BL=300 and BL=350, and the rate of increase at positions from BL=350 to 500 is higher than the rate of increase at positions from BL=50 to 300.

In this regard, the circumference increasing portion 22 includes a first region and a second region. The first region is contiguous to the beam center portion 21 and extends from BL=50 to a position (between BL=300 and BL=350) at which the rate of increase in the beam width is changed. The beam width of the first region increases at a relatively low rate. The second region is contiguous to the first region and extends from the position of change to BL=510. The beam width of the second region increases at a relatively high rate. The first region and the second region are arranged in the left and right direction of the vehicle body.

[Sectional Shape of Torsion Beam]
—Beam Center Portion 21—

FIG. 6 illustrates sectional shapes of the torsion beam 2 at position A-A (BL=0) and position B-B (BL=50), that is, sectional shapes of the beam center portion 21. As illustrated in FIG. 6, the beam center portion 21 has an inverse substantially v-shaped cross section defined by walls facing in the pivot directions of the trailing arms 1, that is, defined by an upper wall 21a and a lower wall 21b both protruding upward throughout the length of the beam center portion 21.

The upper wall 21a and the lower wall 21b overlap at their upper portion from a tip to the middle of side inclined portions and are spaced apart at their lower portion from the middle of the side inclined portions to curved folded portions.

The beam center portion 21 is formed from the metal pipe 11 such that the circular cross section of the metal pipe 11 is pressed into an inverse substantially v-shaped cross section. The substantially v-shaped structure has a lower degree of torsional resistance than a circular pipe, thereby achieving a torsional stiffness suitable for controlling the position of the vehicle.

—First Region of Circumference Increasing Portion 22—

FIG. 7 illustrates sectional shapes of the torsion beam 2 at positions from position C-C (BL=100) to position G-G (BL=300), that is, sectional shapes in the first region of the circumference increasing portion 22.

The sectional shape of the first region at position C-C (BL=100) is an inverse substantially v-shaped cross section similar to that of the beam center portion 21, but a tip width TW of the tip of the inverse substantially v-shaped cross section extending in the fore and aft direction of the vehicle body is greater than the tip width TW at position B-B (BL=50). The "tip width TW" is defined as a distance between upper ends of the inclined portions substantially linearly sloping from the opposite sides of the tip.

As illustrated in FIG. 7 that illustrates sectional shapes at positions from C-C to G-G, the tip width TW of the first region from position B-B (BL=50) to position G-G (BL=300) gradually increases toward the beam end. Accordingly, the beam width BW gradually increases toward the beam end. As illustrated in FIG. 10, the beam width BW in this region increases at a substantially constant rate (approximately 10 mm per beam length of 100 mm in the BL coordinate).

The beam height BH (a dimension in the direction orthogonal to the beam width direction and the beam longitudinal direction) of the torsion beam 2 from position A-A to position G-G is substantially constant. In other words, the increasing circumferential length L from position B-B in the first region gradually increases the beam width BW (gradually increases the tip width TW) while keeping the beam height BH substantially constant.

The height level of the top of the torsion beam 2 in the first region is constant throughout the length of the first region, and the height level of the top of the first region is at the same level as that of the top of the beam center portion 21.

In the first region, the tip of the lower wall 22b of the circumference increasing portion 22 is in contact with the tip of the upper wall 22a, and the cross-sectional area including a hollow portion inside the beam gradually increases toward the beam end in accordance with the gradual increase in the beam width BW.

Figure 11:
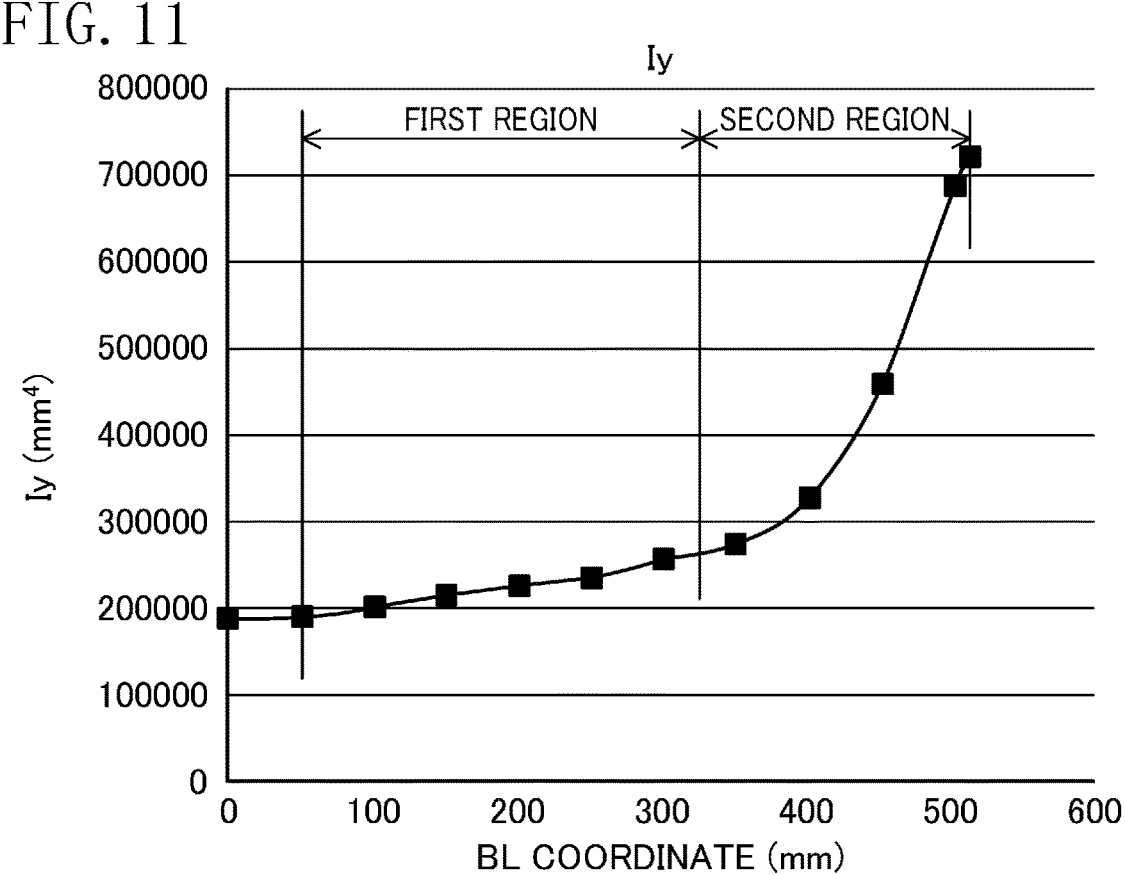
FIG. 11 is a graph illustrating a change in Iy of the torsion beam.
Figure 12:
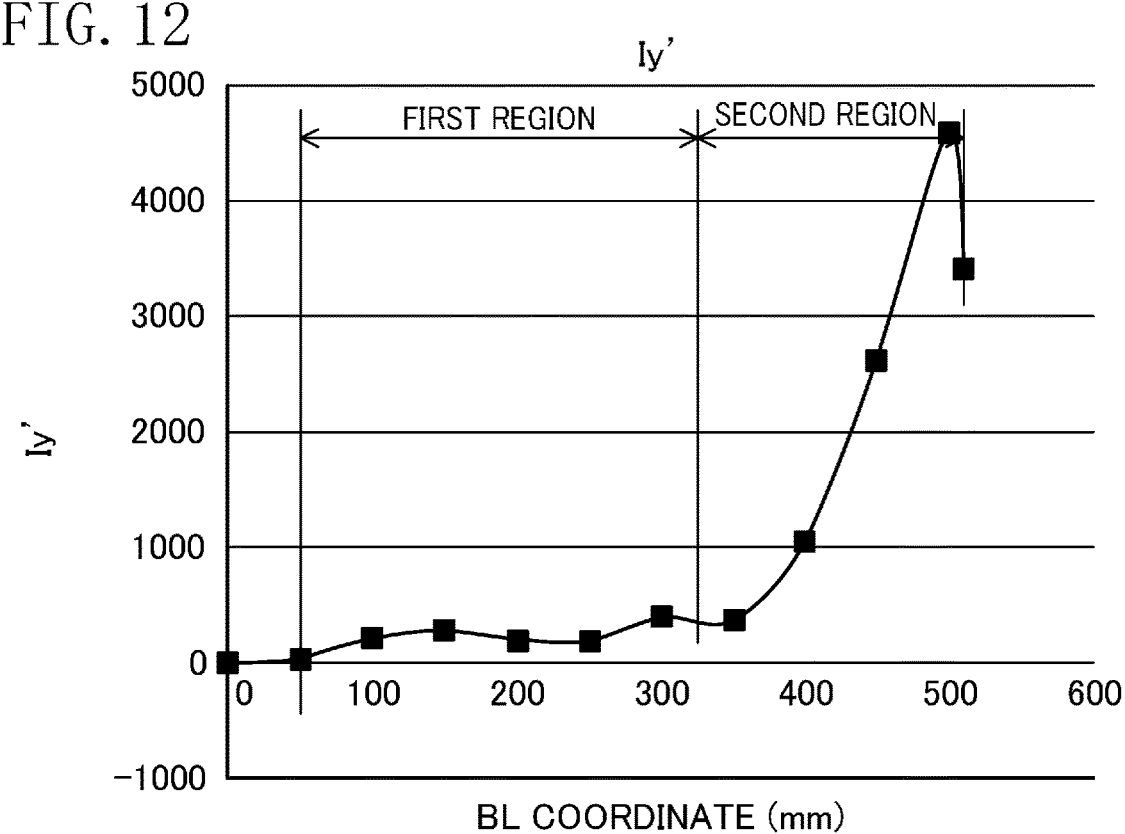
FIG. 12 is a graph illustrating a change in Iy' of the torsion beam.

FIG. 11 illustrates a change in second moment of area Iy of the torsion beam 2 in the BL coordinate with respect to a y-axis (horizontal axis orthogonal to the torsion beam), and FIG. 12 illustrates a first derivative Iy' of Iy over the distance in the BL coordinate. As illustrated in FIG. 11, no reduction in the second moment of area Iy is observed in the first region (the second moment of area slightly increases). This indicates that the substantially constant beam height BH in the first region maintains the bending strength about the horizontal axis (bending in the vertical direction).

Figure 13:
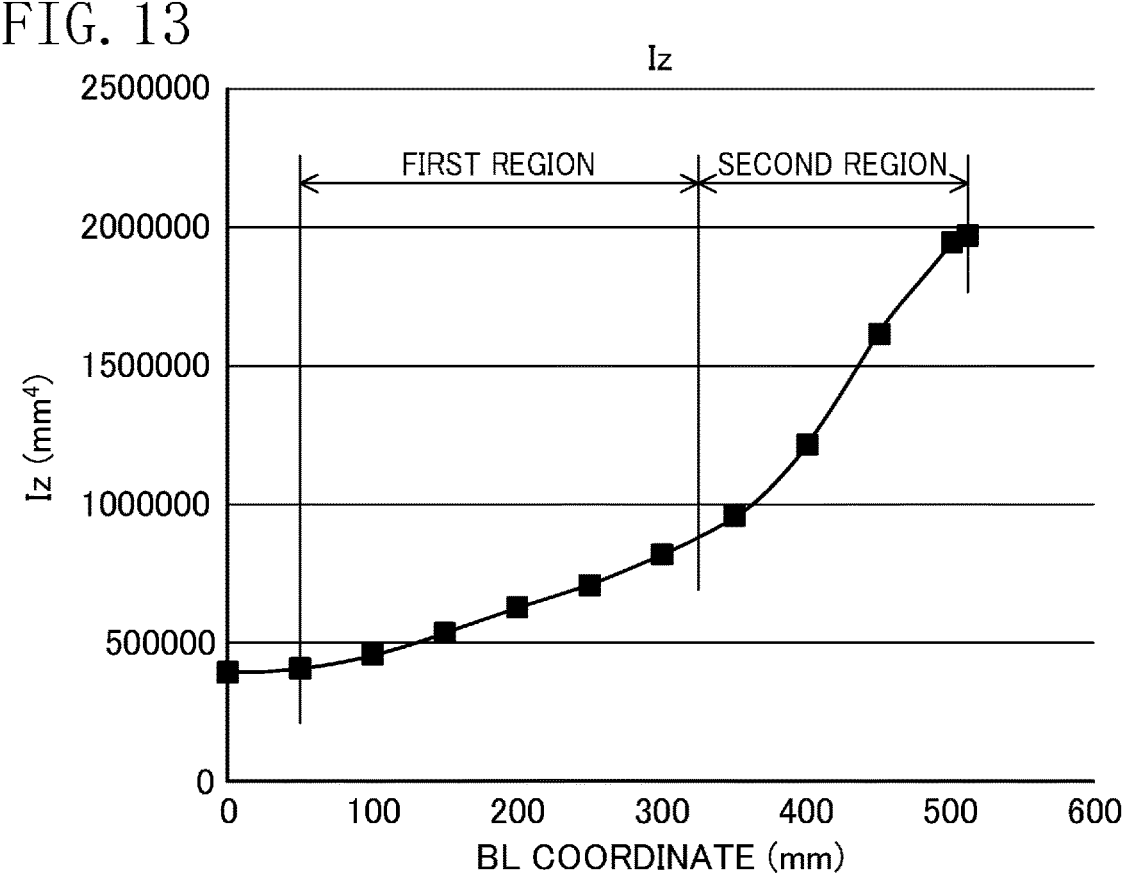
FIG. 13 is a graph illustrating a change in Iz of the torsion beam.
Figure 14:
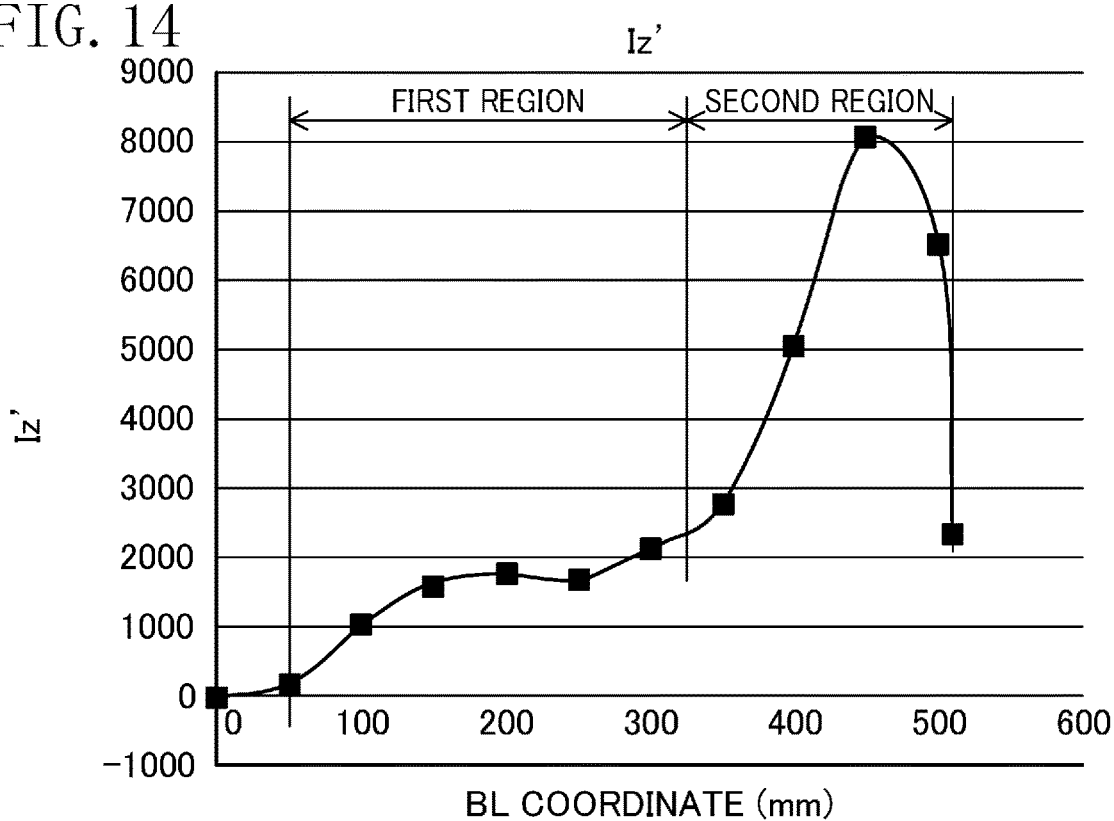
FIG. 14 is a graph illustrating a change in Iz' of the torsion beam.
Figure 15:
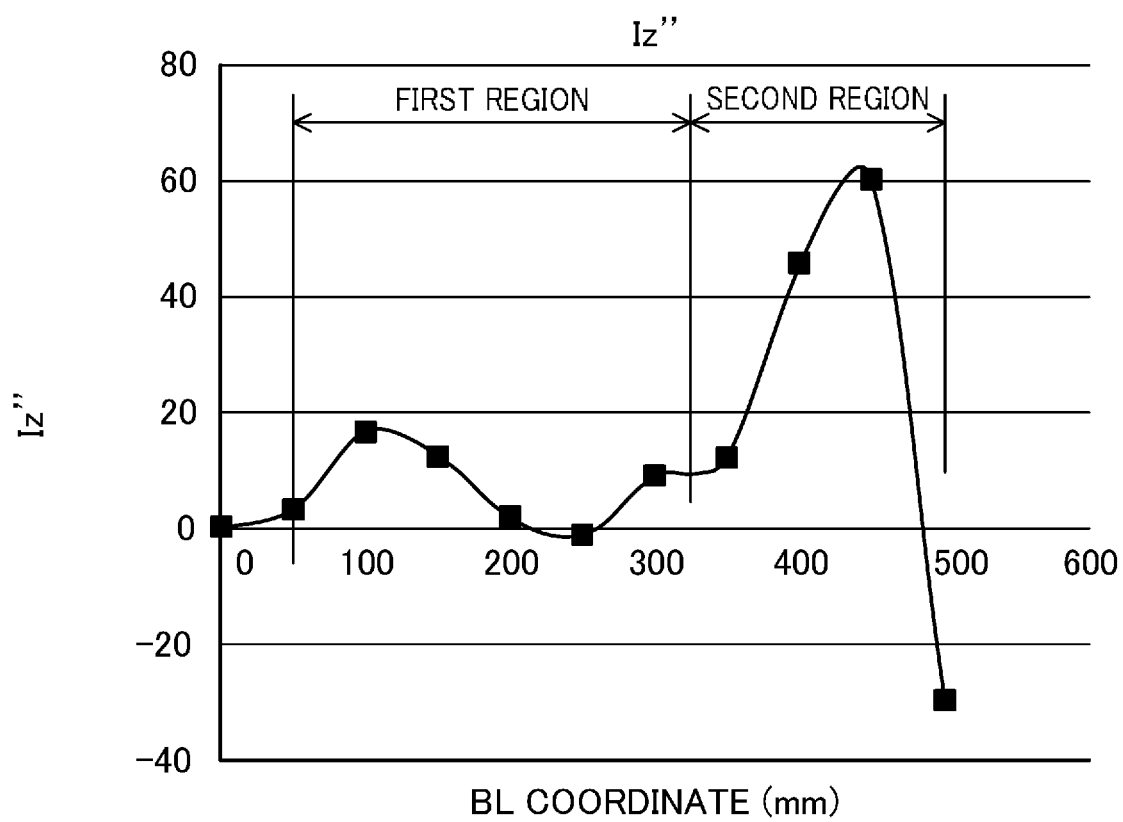
FIG. 15 is a graph illustrating a change in Iz" of the torsion beam.

FIG. 13 illustrates a change in second moment of area Iz of the torsion beam 2 in the BL coordinate with respect to a z-axis (vertical axis), FIG. 14 illustrates a first derivative Iz' of Iz over the distance in the BL coordinate, and FIG. 15 illustrates a second derivative Iz" of Iz over the distance in the BL coordinate. As illustrated in FIG. 13, the second moment of area Iz gradually increases at a substantially constant rate in the first region of the circumference increasing portion 22. This is due to a gradual increase in the beam width BW and the cross-sectional area toward the beam end.

In the first region of the circumference increasing portion 22, the beam width BW gradually increases toward the beam end while the beam height BH is substantially constant. This configuration gradually increases the bending strength about the vertical axis (bending in the horizontal direction) toward the beam end while keeping the bending strength about the horizontal axis.

—Second Region of Circumference Increasing Portion 22—

FIG. 8 illustrates sectional shapes of the torsion beam 2 at positions from H-H (BL=350) to L-L (BL=510), that is, sectional shapes in the second region of the circumference increasing portion 22.

The cross section at position H-H (BL=350) in the second region is generally an inverse substantially v-shaped cross section similar to that of the first region, but the second region differs from the first region in that the tip of the lower wall 22b is apart from the tip of the upper wall 22a and the tip of the upper wall 22a is curved at a lower degree of curvature. As a result, the second region has a greater beam width BW at position H-H than the first region and has a greater beam height BH. Such a change in shape continues to occur at positions I-I (BL=400), J-J (BL=450), and K-K (BL=500). At position L-L (BL=510), the lower wall 22b is changed to a substantially planar wall.

In other words, both beam width BW and beam height BH in the second region gradually increase toward the beam end. Accordingly, the cross-sectional area including the hollow portion inside the beam gradually increases toward the beam end.

The beam width BW of the second region increases at a substantially constant rate, and at a higher rate than that of the first region, which is approximately 20 mm per beam length of 100 mm in the BL coordinate.

The cross-sectional area of the second region increases at a substantially constant rate, and at a higher rate than that of the first region.

The height level of the top of the torsion beam 2 in the second region is constant throughout the length of the second region, and the height level of the top in the second region is the same as that of the beam center portion 21 and the first region.

As illustrated in FIG. 11, the second moment of area Iy with respect to the y-axis (horizontal axis orthogonal to the torsion beam) significantly increases toward the beam end in the second region. Such an increase is due to the gradual increase in the beam height BH and the cross-sectional area. As illustrated in FIG. 13, the second moment of area Iz with respect to the z-axis (vertical axis) increases at a higher rate in the second region than in the first region. Such an increase is due to the gradual increase in the beam width BW and the cross-sectional area.

As described above, the beam width BW, the beam height BH, and the cross-sectional area of the second region of the circumference increasing portion 22 gradually increase toward the beam end, and accordingly, the bending strength about the horizontal axis (bending in the vertical direction) and the bending strength about the vertical axis (bending in the horizontal direction) gradually increase toward the beam end.

—Torsional Characteristics—

Figure 16:
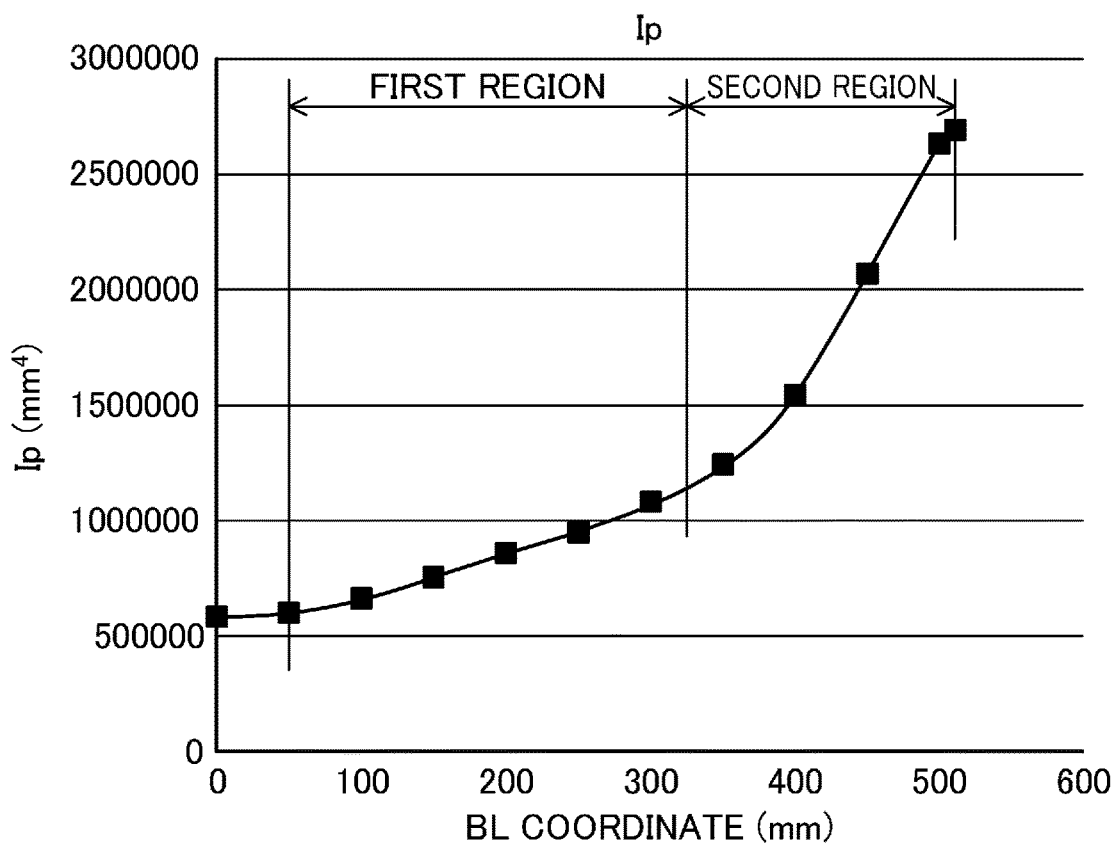
FIG. 16 is a graph illustrating a change in Ip of the torsion beam.
Figure 17:
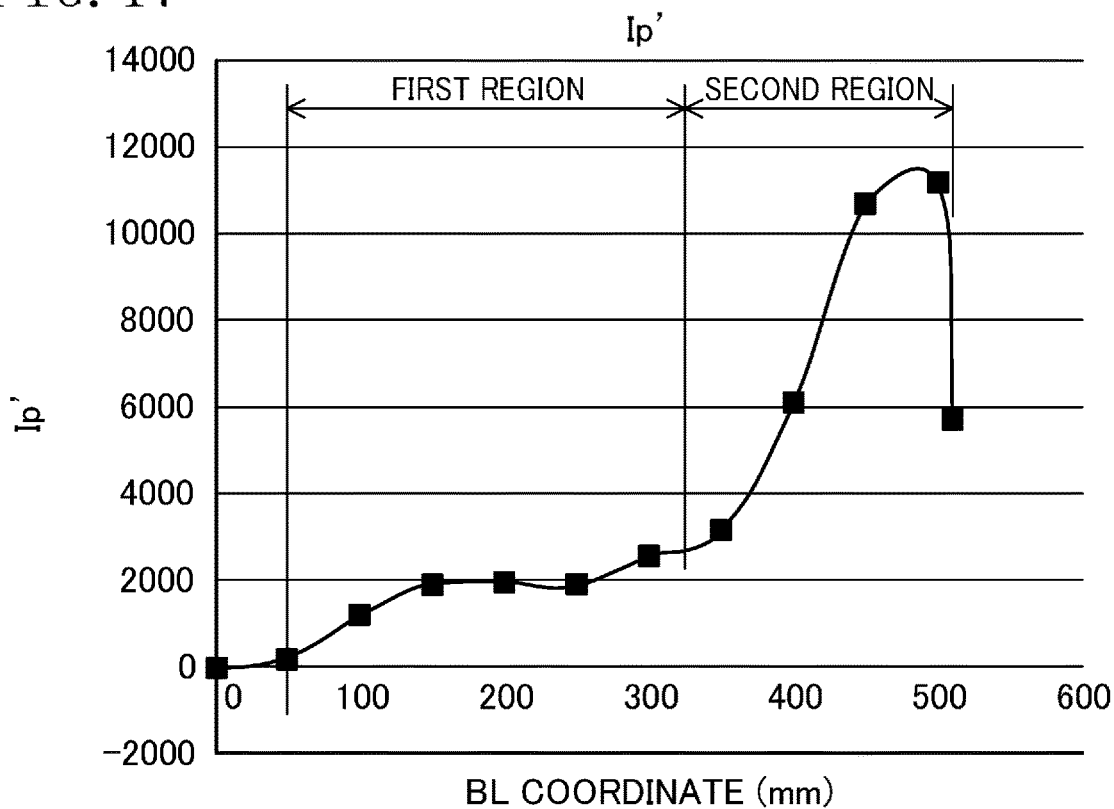
FIG. 17 is a graph illustrating a change in Ip' of the torsion beam.

FIG. 16 illustrates a change in second polar moment of area Ip of the torsion beam 2 in the BL coordinate with respect to the y-axis (horizontal axis orthogonal to the torsion beam), and FIG. 17 illustrates a first derivative Ip' of Ip over the distance in the BL coordinate. The second polar moment of area Ip describes resistance to torsional deformation and is expressed as Ip=Iy+Iz.

As can be seen from the change characteristics of Iy in the BL coordinate illustrated in FIG. 11 and the change characteristics of Iz in the BL coordinate illustrated in FIG. 13, the beam center portion 21 (from BL=−50 to +50) exhibits a substantially constant Ip, and Ip gradually increases in the first region of the circumference increasing portion 22 and increases at a higher rate in the second region than in the first region.

As illustrated in FIGS. 14 and 15, which illustrate, respectively, the first derivative Iz' and the second derivative Iz" of the second moment of area Iz with respect to the z-axis, Iz significantly increases at the periphery of the boundary between the beam center portion 21 and the circumference increasing portion 22 (from BL=50 to 100). Accordingly, Ip significantly increases as illustrated in FIG. 17 that illustrates Ip' characteristics.

This means that the torsion beam 2 twists at a constant angle at the beam center portion 21 exhibiting substantially constant Ip, whereas the torsion beam 2 is suddenly resistant to torsion in the circumference increasing portion 22. In other words, most of the torsional deformation of the torsion beam 2 occurs at the beam center portion 21 and the torsional stiffness of the torsion beam 2 is substantially determined by the torsional stiffness of the beam center portion 21.

With the configuration of the torsion beam 2 described above, changing the ratio of the beam center portion 21 to the circumference increasing portion 22 in length can adjust the suspension characteristics. For example, a longer beam center portion 21 gives the torsion beam 2 softer suspension characteristics and improves ride comfort of the vehicle, whereas a shorter beam center portion 21 gives the torsion beam 2 harder suspension characteristics and improves handling stability of the vehicle.

CONCLUSION

Providing the circumference increasing portions 22 having a gradually increasing circumferential length L toward the beam ends at the opposite sides of the beam center portion 21 having a constant sectional shape can achieve the following functional effects.

Providing the circumference increasing portions 22 at the opposite sides of the beam center portion 21 can gradually increase the beam width BW toward the beam ends without reducing the beam height BH. This configuration can achieve a sufficient mount strength of the trailing arms 1 at the beam ends.

In addition, this configuration allows the torsion beam 2 to have a constant Ip at the beam center portion 21 and have a gradually increasing Ip toward the beam ends at the opposite sides of the beam center portion 21. In this regard, adjusting the sectional shape and the length of the beam center portion 21 can adjust the torsional stiffness of the torsion beam 2. This adjustment can achieve both suitable torsional stiffness for the desired suspension characteristics and sufficient mount strength of the trailing arms.

Portions at the opposite sides of the beam center portion 21 are each divided into a plurality of regions arranged in the left and right direction of the vehicle body, and the beam width BW can be increased at a higher rate as the position of the beam width is closer to the beam end.

As described in the embodiment above, the circumference increasing portions 22 disposed at the opposite sides of the beam center portion 21 are each divided into the first region and the second region, and the beam width BW can be increased in two phases in the first region and the second region.

In this regard, the first region serves to achieve a suitable torsional stiffness and a sufficient bending strength (bending in the vertical direction and the horizontal direction), and the second region serves to further increase the bending strength. This configuration can achieve both suitable torsional stiffness and sufficient bending strength. Moreover, this configuration can prevent a sudden change in the beam width at the boundary between the first region and the second region, thereby preventing concentration of stress. In other words, this configuration can achieve a sufficient mount strength of the trailing arms 1 without concentrating stress.

Although, in the embodiment above, the beam center portion 21 has an inverse substantially v-shaped cross section, it may have a substantially v-shaped cross section.

Although, in the embodiment above, the circumference increasing portion 22 includes the first and the second regions, it may include three or more regions.

What is claimed is:

1. A vehicle torsion beam suspension comprising:
a pair of trailing arms each supporting a wheel to a vehicle body and a torsion beam having a closed cross section, the torsion beam connecting the trailing arms together, wherein each trailing arm includes a pivot support portion at an end in a longitudinal direction of the trailing arm to pivotally support the trailing arm relative to the vehicle body, and a wheel mounting portion at another end in the longitudinal direction of the trailing arm, the wheel mounting portion being a portion to which the wheel is mounted, the torsion beam has beam ends at opposite ends in a longitudinal direction of the torsion beam, the beam ends each being bonded to a middle portion between the pivot support portion and the wheel mounting portion of the trailing arm, the torsion beam includes a beam center portion having a substantially v-shaped cross section at a center in the longitudinal direction of the torsion beam, the substantially v-shaped cross section being defined by walls facing in pivot directions of the trailing arms, the walls protruding in one of the pivot directions, the torsion beam includes circumference increasing portions at opposite sides of the beam center portion, each circumference increasing portion having a circumferential length that is an entire length in a circumferential direction of the beam longer than a circumferential length of the beam center portion, the circumferential length of the circumference increasing portion increasing toward the beam end, and the circumference increasing portion has a beam width that is a dimension corresponding to the longitudinal direction of the trailing arm, the beam width gradually increasing toward the beam end and increasing at a higher rate as a position of the beam width is closer to the beam end.

2. A vehicle torsion beam having a closed cross section, the torsion beam connecting a pair of trailing arms each supporting a wheel to a vehicle body, the torsion beam comprising:

a beam center portion having a substantially v-shaped cross section at a center in a longitudinal direction of the torsion beam, the substantially v-shaped cross section being defined by walls facing in pivot directions of the trailing arms, the walls protruding in one of the pivot directions; and circumference increasing portions at opposite sides of the beam center portion, each circumference increasing portion having a circumferential length that is an entire length in a circumferential direction of the beam longer than a circumferential length of the beam center portion, the circumferential length of the circumference increasing portion increasing toward a beam end bonded to a trailing arm, wherein the circumference increasing portion has a beam width that is a dimension corresponding to a longitudinal direction of the trailing arms, the beam width gradually increasing toward the beam end and increasing at a higher rate as a position of the beam width is closer to the beam end.

3. The vehicle torsion beam of claim 2, wherein the circumference increasing portion has a cross-sectional area including a hollow portion inside the beam, the cross-sectional area gradually increasing toward the beam end and increasing at a higher rate as a position of the cross-sectional area is closer to the beam end.

4. The vehicle torsion beam of claim 2, wherein the circumference increasing portion has a wall thickness substantially equal to a wall thickness of the beam center portion.

5. The vehicle torsion beam of claim 2, wherein the circumference increasing portion includes a plurality of regions arranged in the longitudinal direction of the torsion beam and each region has a beam width gradually increasing toward the beam end, and the beam width of a region closer to the beam end increases at a higher rate.

6. The vehicle torsion beam of claim 5, wherein each region has a circumferential length gradually increasing toward the beam end.

7. The vehicle torsion beam of claim 5, wherein each region of the circumference increasing portion has a cross-sectional area gradually increasing toward the beam end and the cross-sectional area of a region closer to the beam end increases at a higher rate.

8. The vehicle torsion beam of claim 5, wherein the beam center portion extends in the longitudinal direction of the torsion beam in a constant, substantially v-shaped cross section, the circumference increasing portion includes a first region contiguous to the beam center portion and a second region contiguous to the first region as the regions, and the first region has a substantially v-shaped cross section similar to the cross section of the beam center portion and has a tip width at a tip of the substantially v-shaped cross section extending in a direction of the beam width, the tip width gradually increasing toward the second region.

9. The vehicle torsion beam of claim 8, wherein the first region has a dimension in a direction orthogonal to the beam width direction and the longitudinal direction of the torsion beam, the dimension being substantially equal to a dimension of the beam center portion in the same direction or the dimension gradually increasing from the beam center portion toward the second region.

10. The vehicle torsion beam of claim 8, wherein the walls facing in the pivot directions of the trailing arms in the second region are gradually spaced apart from each other in the pivot directions as the walls are closer to the beam end, and the second region has a cross-sectional area including a hollow portion inside the beam, the cross-sectional area gradually increasing toward the beam end.

11. The vehicle torsion beam of claim 2, wherein a maximum rate of increase in the circumferential length of the circumference increasing portion relative to the circumferential length of the beam center portion is 10% or more.

12. The vehicle torsion beam of claim 2, wherein a maximum rate of increase in the circumferential length of the circumference increasing portion relative to the circumferential length of the beam center portion is 30% or less.

* * * * *